(12) United States Patent
Jenkins

(10) Patent No.: US 8,152,091 B2
(45) Date of Patent: Apr. 10, 2012

(54) PRODUCTION OR DISTRIBUTION OF RADIATIVE FORCING AGENTS

(75) Inventor: Robert Theodore Jenkins, Sacramento, CA (US)

(73) Assignee: Robert Theodore Jenkins, Sacramento, CA (US)

( * ) Notice: Subject to any disclaimer, the term of this patent is extended or adjusted under 35 U.S.C. 154(b) by 973 days.

(21) Appl. No.: 12/119,467

(22) Filed: May 12, 2008

(65) Prior Publication Data

US 2009/0255999 A1    Oct. 15, 2009

Related U.S. Application Data

(60) Provisional application No. 61/044,287, filed on Apr. 11, 2008.

(51) Int. Cl.
*B64D 47/00* (2006.01)
(52) U.S. Cl. ............... 244/1 R; 250/493.1; 250/505.1
(58) Field of Classification Search ... 244/1; 250/493.1, 250/505.1
See application file for complete search history.

(56) References Cited

U.S. PATENT DOCUMENTS

| | | | | | |
|---|---|---|---|---|---|
| 3,978,342 | A | * | 8/1976 | Hagen et al. | 250/495.1 |
| 4,755,673 | A | * | 7/1988 | Pollack et al. | 250/330 |
| 5,003,186 | A | * | 3/1991 | Chang et al. | 250/505.1 |
| 2006/0219956 | A1 | * | 10/2006 | Bergman et al. | 250/493.1 |
| 2008/0203328 | A1 | * | 8/2008 | Palti | 250/515.1 |
| 2010/0043443 | A1 | * | 2/2010 | Noppel et al. | 60/772 |
| 2010/0132330 | A1 | * | 6/2010 | Noppel et al. | 60/39.5 |
| 2010/0251789 | A1 | * | 10/2010 | Baird | 71/23 |
| 2011/0036919 | A1 | * | 2/2011 | Baird | 239/2.1 |

OTHER PUBLICATIONS

"Albedo Enhancement by Stratospheric Sulfur Injections: A Contribution to Resolve a Policy Dilemma?", An Editorial Essay, Climatic Change (2006), DOI: 10.1007/s10584-006-9101-y, Springer 2006.
1999 Report—Aviation and the Global Atmosphere, Chapter 3, Aviation-Produced Aerosols and Cloudiness.
1999 Report—Aviation and the Global Atmosphere, Chapter 6, Potential Climate Change from Aviation.
1999 Report—Aviation and the Global Atmosphere, Chapter 7, Aircraft Technology and Its Relation to Emissions.
2007 Report—Climate Change 2007 the Physical Science Basis, Chapter 1, Historical Overview of Climate Change Science.
2007 Report—Climate Change 2007 the Physical Science Basis, Chapter 2, Changes in Atmosphere Constituents and in Radiative Forcing.
2001 Report—Chapter 5, Aerosols, their Direct and Indirect Effects.
Botkin, Daniel B., "Global Warming Delusions", http://online.wsj.com/article_print/SB119258265537661384.html, Oct. 17, 2007; p. A19.
Caldera, "Introduction to the Chemtrail Issue", http://www.chemtrails911.com/intro_to_chem.htm, downloaded from the internet Jun. 26, 2008, Chemtrails911.com © 2003-2007.
Carey, John, "Solar's Day in the Sun", *Business Week*, Oct. 15, 2007, pp. 69-76.
Christy, John R., "My Nobel Moment", *The Wall Street Journal*, Nov. 1, 2007; p. A19.

(Continued)

*Primary Examiner* — Christoher P Ellis
(74) *Attorney, Agent, or Firm* — Berkeley Law & Technology Group, LLP (57) ABSTRACT

Embodiments of methods, apparatuses, and systems associated with producing and distributing one or more radiative forcing agents to Earth's atmosphere are disclosed.

20 Claims, 3 Drawing Sheets

OTHER PUBLICATIONS

Keith, David: A surprising idea for "solving" climate change Weblink, http://www.ted.com/index.php/talks/david_keith_s_surprising_ideas_on_climate_change.html, video filmed Sep. 2007.

Lamonica, Martin, "Geoengineered Cooling of Planet would have Perilous Effects", C/Net News.com, Apr. 25, 2008.

Moore, Tam, "Global Warming Issue Heats Up", East Oregonian Publishing Group, 6 pages, Dec. 28, 2006.

Phillips, Graham, "Science is on the case", Theage.com.au, Jan. 7, 2007, 2 pages.

The White House, "Restoring the Quality of Our Environment", Report of the Environmental Pollution Panel President's Science Advisory Committee, pp. 121-127, Nov. 1965.

Tomlinson, Brett, "A Greener World . . ." Princeton Alumni Weekly, Oct. 10, 2007, pp. 18-23.

* cited by examiner

PRODUCTION OR DISTRIBUTION OF RADIATIVE FORCING AGENTS

This application claims the benefit of U.S. Provisional Patent Application Ser. No. 61/044,287, filed by Robert Theodore Jenkins, on Apr. 11, 2008, and titled "Production or Distribution of Radiative Forcing Agents."

FIELD

The present disclosure relates to the field of production or distribution of one or more radiative forcing agents.

BACKGROUND

Many believe Earth may be warming. While much has been made of mankind's contribution to what may be a current global warming trend, it is not certain to what extent mankind may have contributed to global warming. Many if not most approaches discussed in scientific literature to mitigate global warming are reactionary or defensive and revolve around reducing suspected sources of Greenhouse gases. It is entirely possible, however, that global warming would continue even if Greenhouse gases produced by mankind were suspended or eliminated. Regardless, measures that use other approaches may be desirable.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses and systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context. Therefore, the particular context of the description and the usage of these terms may provide helpful guidance regarding inferences to be drawn for that particular context.

Likewise, the terms, "and," "and/or," and "or" as used herein may include a variety of meanings that will depend at least in part upon the context in which it is used. Typically, "and/or" as well as "or" if used to associate a list, such as A, B or C, is intended to mean A, B, or C, here used in the exclusive sense, as well as A, B and C. In addition, the term "one or more" as used herein may be used to describe any feature, structure, or characteristic in the singular or may be used to describe some combination of features, structures or characteristics. Accordingly, for example, "one or more" radiative forcing agents may comprise one radiative forcing agent or some combination of radiative forcing agents. Though, it should be noted that this is merely an illustrative example and claimed subject matter is not limited in scope to this example.

Figure 1:
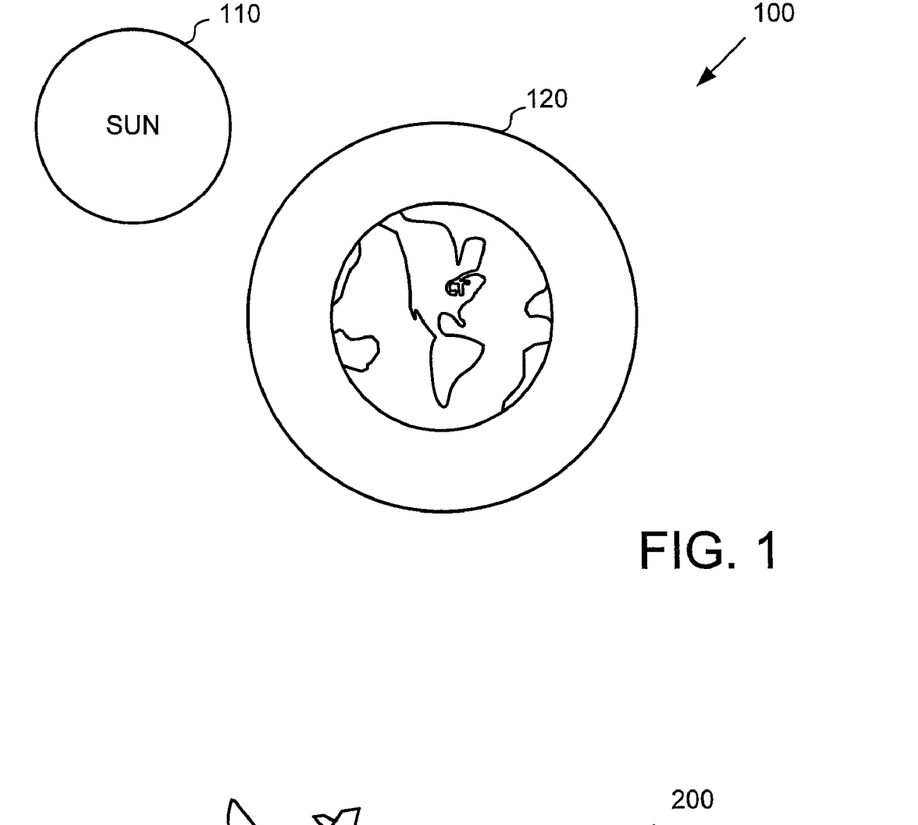
FIG. 1 is a schematic diagram depicting a possible model of the energy balance for a closed system that includes the Earth.

With reference now to FIG. 1, schematic diagram 100 depicts a possible model of the energy balance for a closed system that includes the Earth. Typically, peak radiation emitted from Sun 110 occurs at wavelengths approximately between 0.4 μm to 0.7 μm, much of it in the visible spectrum. A 2007 report by the Intergovernmental Panel on Climate Change, entitled "Climate Change 2007: The Physical Science Basis," (hereinafter, "2007 Report"), estimates the average amount of radiant energy from Sun 110 entering Earth's atmosphere, averaged over the entire Earth, to be roughly equal to 342 watts/m$^2$ (watts/m$^2$ is hereinafter understood to mean watts per square meter, unless specified otherwise). The 2007 Report estimates the amount of incoming radiant energy during the day can be roughly 1,370 watts/m$^2$, which may vary approxlimately between 1,322 watts/m$^2$ to 1,465 watts/m$^2$ depending at least in part on cyclical, orbital or other variations, such as sunspots or faculae, for example. The 2007 Report estimates roughly 30% of the incoming radiant energy from Sun 110 is reflected back into space by Earth's atmosphere and surface. Any remaining incoming energy not reflected back into space may be radiated back into space to maintain Earth's radiative energy balance.

Generally speaking, Earth's atmosphere and surface absorb radiative energy that is not reflected back into space, an amount of energy roughly equal to 240 watts/m$^2$. Earth's atmosphere and surface are cooler than the Sun and, in accordance with Wein's law, they radiate energy received at longer wavelengths, with the peak radiation emitted around the infrared spectrum approximately between 10 μm and 11 μm according to the 2007 Report. Not all energy radiated toward space, however, penetrates Earth's atmosphere. Scientists commonly focus on the portion of Earth's atmosphere 120 comprising Greenhouse gases as one reason some of Earth's radiated energy may not penetrate the atmosphere and therefore may not be radiated into space.

Greenhouse gases may absorb some portion of the energy radiated or reflected by Earth and the surrounding atmosphere. Effects of Greenhouse gases on some of Earth's reflected and radiated energy are often referred to as the "Greenhouse Effect." While not an exhaustive list, some principal catalysts of the Greenhouse Effect are known to include carbon dioxide ($CO_2$), methane ($CH_4$), nitrogen oxides ($NO_x$), chlorofluorocarbons (CFCs), hydrochlorofluorocarbons (PFCs), sulphur hexafluroride ($SF_6$) and water vapor ($H_2O$). According to the 2007 Report, $H_2O$ is almost continually present somewhere in the atmosphere, while many remaining gases listed above tend to contribute to the Greenhouse Effect due, in some measure, to the observation that they are generally considered to have longer atmospheric residence times.

Greenhouse gases represent a small fraction of the overall composition of Earth's atmosphere. Greenhouse gases, however, exist in quantities sufficient to alarm a general and growing consensus of atmospheric scientists, many of whom attribute any possible global warming trend to the increased proliferation of atmospheric Greenhouse gases. According to the 2007 Report, the cumulative mass of Greenhouse gases has risen steadily above background levels since the beginning of the Industrial Revolution, particularly $CO_2$. The 2007 Report, estimating the combined effects of anthropogenic emissions, suggested anthropogenic emissions may have increased the radiative energy remaining within Earth by approximately +1.6 watts/$m^2$. This radiative imbalance, according to the 2007 Report, has made it "extremely likely that humans have exerted a substantial warming influence on the climate."

Based in some measure on ever accumulating data supporting anthropogenic induced climate change, many approaches to abate global warming revolve around reducing emissions of Greenhouse gases into the atmosphere, coupled with sequestering existing Greenhouse gases. At a high level, these approaches tend to be reactionary and may suffer from several disadvantages.

Decreased production of Greenhouse gases and sequestration of existing Greenhouse gases are considered to be relatively expensive. Difficulties of implementing a practical mitigation and sequestration plan agreeable to disparate political and economic polities have been well documented. The reluctance of the United States to ratify the Kyoto Treaty serves as one example. Potential deleterious impacts on some developing nations by mandating decreased $CO_2$ production is considered to be another. In addition, decreasing production of Greenhouse gases and sequestering existing gas may still not be enough to significantly stem a global warming trend. Hysteresis in Earth's atmospheric system and any potential self-reinforcing effects of global warming may compound existent inaccuracies in climate prediction models, making effects of $CO_2$ mitigation and sequestration difficult to forecast. Thus, Earth may continue to warm even if mitigation or sequestration were implemented successfully.

Figure 2:
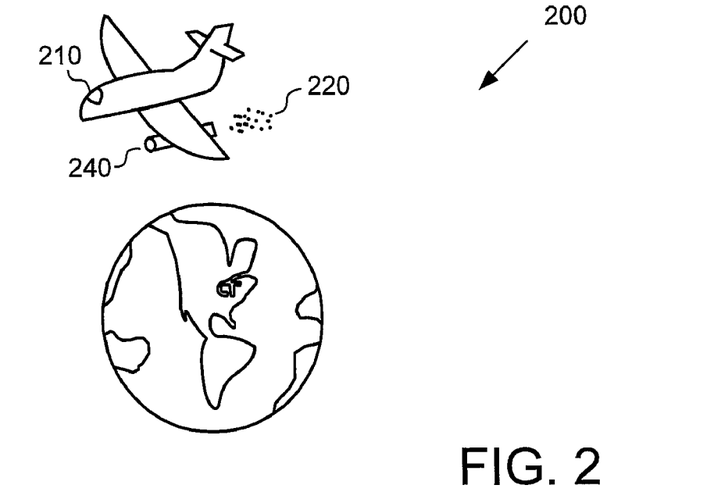
FIG. 2 is a schematic diagram depicting a system that includes an embodiment to produce or distribute one or more radiative forcing agents in accordance with one embodiment.
Figure 3:
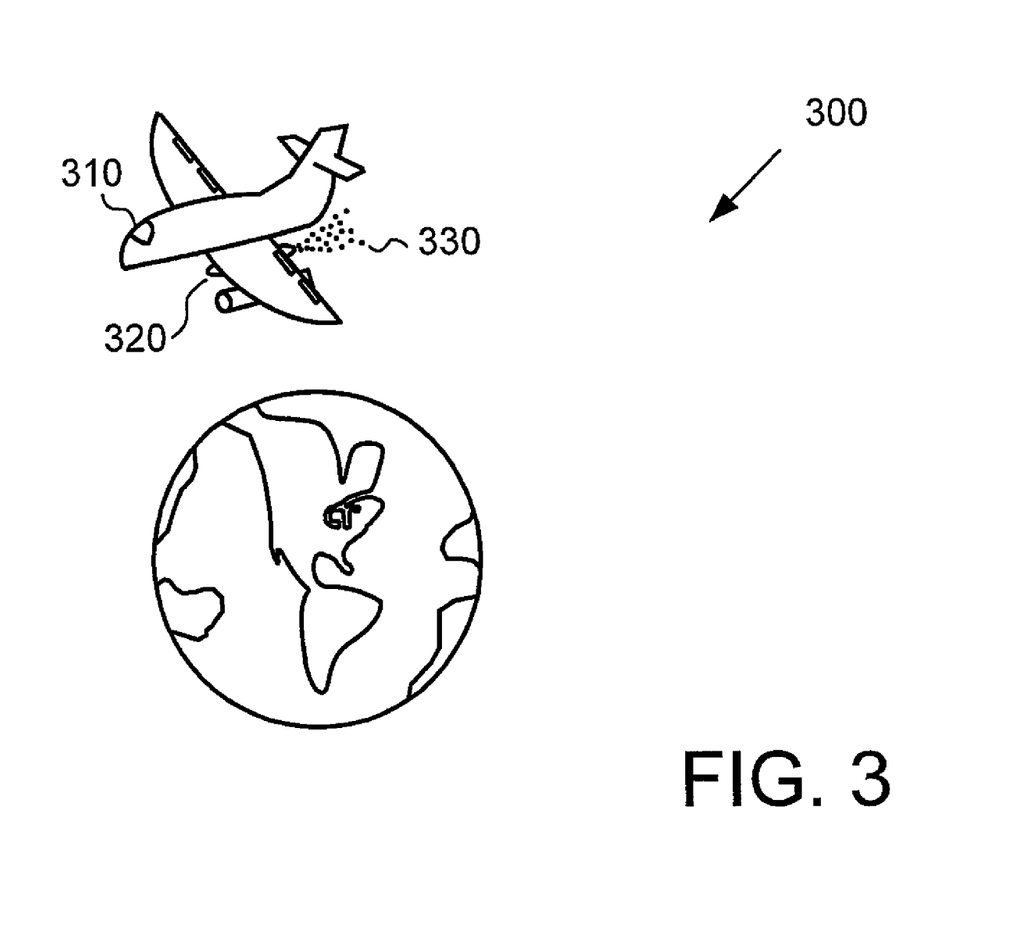
FIG. 3 is a schematic diagram depicting a system that includes an embodiment to distribute one or more radiative forcing agents in accordance with another embodiment.

FIG. 2 is a schematic diagram depicting a system that includes embodiment 200 to produce or distribute one or more radiative forcing agents to Earth's atmosphere. In this context, the term radiative forcing agent is intended to refer to one or more substances that are used at least in part to produce a negative net radiative forcing effect, a negative direct radiative forcing effect or a negative indirect radiative forcing effect.

Radiative forcing comprises a quantitative measure to assess the impact of natural and anthropogenic drivers of climate change, typically through a component by component analysis. For example, radiative forcing may be used to assess the impact of $CO_2$ on climate change, as an example component. One measure adopted by the Intergovernmental Panel on Climate Change in the 2007 Report defines radiative forcing as "the change in net irradiance (solar plus long wave; in watts/$m^2$) at the tropopause after allowing for stratospheric temperatures to readjust to radiative equilibrium, but with surface and tropospheric temperatures and state held fixed at the unperturbed values." Those skilled in the art will appreciate that this particular measure of radiative forcing is illustrative and claimed subject matter is not limited in scope to this or any particular radiative forcing method. By way of example and not limitation, other radiative forcing methods may be used, such as those methods used for "Instantaneous Radiative Forcing" or "Equilibrium Climate Response," as just two examples.

In addition, different methodologies or processes associated with a particular method of radiative forcing may be employed to calculate radiative forcing. For example, depending on the method used, radiative forcing is sometimes calculated at the top of the atmosphere; other times, radiative forcing is calculated at the surface. Additionally, radiative forcing calculation may account for natural as well as anthropogenic components. Again, those skilled in the art will recognize that claimed subject matter is not limited in scope to any particular methodology or process of calculating radiative forcing. Likewise, the method recited previously, including any methodology associated with that method, is illustrative only of a method that may be used according to one or more embodiments and it is not limited to any particular embodiment.

However, defined, radiative forcing can typically be further subdivided into direct radiative forcing effects, indirect radiative forcing effects or net radiative forcing effects. For example, reflection and absorption effects of aerosol particles on radiation are considered direct radiative forcing effects. Aerosol particles may also have indirect radiative forcing effects, some of which may include effects aerosols occasion on cloud formation, cloud microphysics or aircraft contrails, as a few non-limiting examples. One common radiative forcing computation methodology assigns positive and negative values, typically expressed in watts/$m^2$, to any direct or indirect radiative forcing effects of particular components which may be present in Earth's atmosphere. Often direct and indirect radiative forcing effects are summed to equal the net radiative forcing effect of a particular component. Occasionally, direct and indirect radiative forcing effects may also be expressed individually, which is sometimes the case where direct effects can be computed with relative accuracy but computing indirect effects proves overly speculative or onerous, for example. In general, substances with a net positive radiative forcing have some tendency to warm the Earth, while substances with a net negative radiative forcing have some tendency to cool the Earth.

Referring again to FIG. 2, embodiment 200 depicts vehicle 210 as being capable of flight. In this context, vehicle means a device for transporting. Accordingly, a vehicle may take several forms and claimed subject matter is not limited in scope to any particular form. For example, here vehicle 210 comprises an aircraft. To provide just a few additional examples without limitation, one skilled in the art will appreciate that vehicle 210 may be any vehicle capable of operating within Earth's atmosphere, including balloons, dirigibles, rockets, gyroplanes, and satellites, for example. In addition, Earth's atmosphere includes any altitude where Earth's atmosphere may be detected. Thus, Earth's atmosphere includes, for example, the stratosphere, the mesosphere and the exosphere, as just a few examples.

Embodiment 200 depicts vehicle 210 including one or more apparatus capable of producing radiative forcing agent 220. Radiative forcing agents may be produced at least in part by physical or chemical changes or by physical or chemical reactions. Thus, radiative forcing agent 220 may be produced, for example, utilizing radiative forcing constituents, such that one or more constituents may become radiative forcing agent 220 at least in part as a result of one or more physical or chemical changes. Likewise, radiative forcing agent 220 may also be produced, for example, utilizing radiative forcing reactants, such that one or more reactants may become radiative forcing agent 220 at least in part as a result of one or more physical or chemical reactions.

Referring again to embodiment 200 in FIG. 2, engine 240 is displayed coupled to vehicle 210. In this embodiment, engine 240 is shown producing radiative forcing agent 220 as a product of combustion, at least in part. Thus, engine 240 may be utilized as a source of propulsion for vehicle 210. In addition, engine 240 may also be utilized as a heat source which produces sufficient heat to induce physical or chemical changes, or physical or chemical reactions, in one or more radiative forcing constituents or radiative forcing reactants. Of course, those skilled in the art will appreciate that other apparatus coupled to vehicle 210 may be utilized to produce one or more radiative forcing agents. For example, where a heat source is utilized to produce one or more radiative forcing agents, vehicle systems or components other then engine 240, such as, for example, an auxiliary power unit, an environment control system, or some combination thereof, may be employed.

In addition, while in this embodiment radiative forcing agent 220 may be produced as a product of combustion, at least in part, those skilled in the art will recognize that production of radiative forcing agent 220 need not be so limited. For example, again where a heat source is utilized to produce a physical or chemical change or to produce a physical or chemical reaction, radiative forcing agent constituents or reactants may be introduced into an exhaust stream, such as in or near the exhaust of engine 240, where they may be oxidized, for example, to produce one or more radiative forcing agents. To be clear, however, claimed subject matter encompasses any way in which one or more radiative forcing agents may be produced at least in part as a result of a physical or chemical change or as a result of a physical or chemical reaction.

As depicted in embodiment 200, radiative forcing agent 220 comprises the gas Sulfur Dioxide ($SO_2$). $SO_2$ may be produced by engine 240 as a product of the combustion of fuel common to commercial aircraft. Thus, in this embodiment, the reactants to produce $SO_2$ comprise typical aviation fuel which is oxidized as a product of combustion to produce $SO_2$. Of course, suitable radiative forcing agents are not limited to $SO_2$ and may comprise, as mentioned previously, any substances capable of producing the desired radiative forcing effects. Thus, for example, elemental Sulfur (S), Carbon Disulfide ($CS_2$), and Hydrogen Sulfide ($H_2S$), to provide just a few additional examples without limitation, may comprise some other suitable radiative forcing agents.

In embodiment 200 radiative forcing agent 220 is depicted as being delivered to Earth's atmosphere utilizing or as part of the exhaust of engine 240. Those skilled in the art will recognize that radiative forcing agent 220 may be delivered to Earth's atmosphere utilizing vehicle systems, flight forces, or other natural forces such as wind current, as a few non-limiting examples. To be clear, it is to be understood that we intend to cover any manner of distribution known to one of ordinary skill in the art and any examples are merely for illustrative purposes only.

One advantage of this embodiment may be that current aviation fuel having less refinement may be employed. For example, quantities of $SO_2$ or, more generally, the oxides of sulfur, produced incident to combustion are suggested to be highly proportional to the sulfur content of the fuel. Sulfur is commonly present in aviation fuel due, in part, to organic acids associated with sulfur which provide lubricity for aviation fuel components. While commonly present in some quantity, acceptable levels of sulfur in fuel, however, have been restricted by national and international regulatory agencies, such as the International Civil Aviation Organization (ICAO). For example, ICAO rules currently require aviation fuel to contain no more than 0.3% sulfur by weight. In practice, however, a 1999 report by the Intergovernmental Panel on Climate Change entitled "Aviation and the Global Atmosphere," (hereinafter "1999 Report") estimated sulfur content in typical aviation fuel has been less than 0.1% by weight, ranging approximately between 0.04% and 0.06% by weight, with a mean of 0.4 g S/kg fuel or 400 parts per million by mass. The 1999 Report suggested roughly 90% of all aviation fuels have a sulfur content of less than 0.1% by weight.

Currently, most aviation fuel typically comprises hydrocarbon fuel produced from crude oil. One type of crude oil considered to be low sulfur crude- the sought after "sweet crude"—typically contains less than 0.5% sulfur by weight. Thus, even crude considered to contain low-sulfur contents generally will undergo further refinement to reduce the sulfur content to standard aviation levels of less than 0.1% sulfur by weight. One process, called hydro-processing, is commonly employed to reduce sulfur content from crude oil and is believed by many to be financially and environmentally costly. For example, the 1999 Report estimated hydro-processing 1kg of fuel to 0.06% sulfur by weight produced roughly 0.0033 kg of $CO_2$. Thus, one sample advantage of this embodiment may be that fuel would not need to undergo as much hydro-processing refinement, if any at all. Fuel that may otherwise be considered waste due to its sulfur content could be used and, in effect, may be recycled.

As another example of embodiment 200, the use of fuels containing several different sulfur contents may be carried and used. Vehicle 210, could carry fuels considered to have low sulfur contents, such as those used in typical aviation fuel, containing roughly 0.1% sulfur content by weight, for example. Such lower sulfur fuel may be used for ground operations, at altitudes, or within atmospheric conditions where emitting $SO_2$ may be considered undesirable. Fuels with higher sulfur content, such as those fuels with sulfur contents exceeding 0.1% by weight, for example, could be used while vehicle 210 was operating within Earth's atmosphere at particular altitudes or within atmospheric conditions believed more desirable for $SO_2$ distribution.

Another advantage of embodiment 200 is that state of the art aircraft engines may be modified to produce radiative forcing agent 220. State of the art aircraft, like the commercial aviation fleet, for example, may be modified to produce sufficient $SO_2$, which may provide one apparatus to implement this approach without substantial public cost. Another related advantage occurs where one or more radiative forcing agents are produced at least in part by constituents or reactants being introduced into an exhaust stream. In that embodiment, for example, constituents or reactants may not have to be introduced into an engine, such as in the combustion chamber, which may mitigate wear or damage the introduction of constituents or reactants may otherwise occasion.

As mentioned previously, embodiment 200 depicts vehicle 210 distributing radiative forcing agent 220, here shown to be $SO_2$, into Earth's atmosphere. One reason $SO_2$ may be utilized as a radiative forcing agent is because it is well known that $SO_2$ plays a role in the formation of sulfate aerosol, which may be formed by such process as aqueous phase reactions of sulphuric acid within cloud droplets or as condensational accumulation on pre-existing particles. According to the 2007 Report, direct radiative forcing effects for aerosols can be dependent on specific particle properties like particle size, for example, and can depend also on such properties as single 
scattering albedo, specific extinction coefficient, or scattering phase function of the aerosol particle, as a non-exhaustive list.

Figure 4:
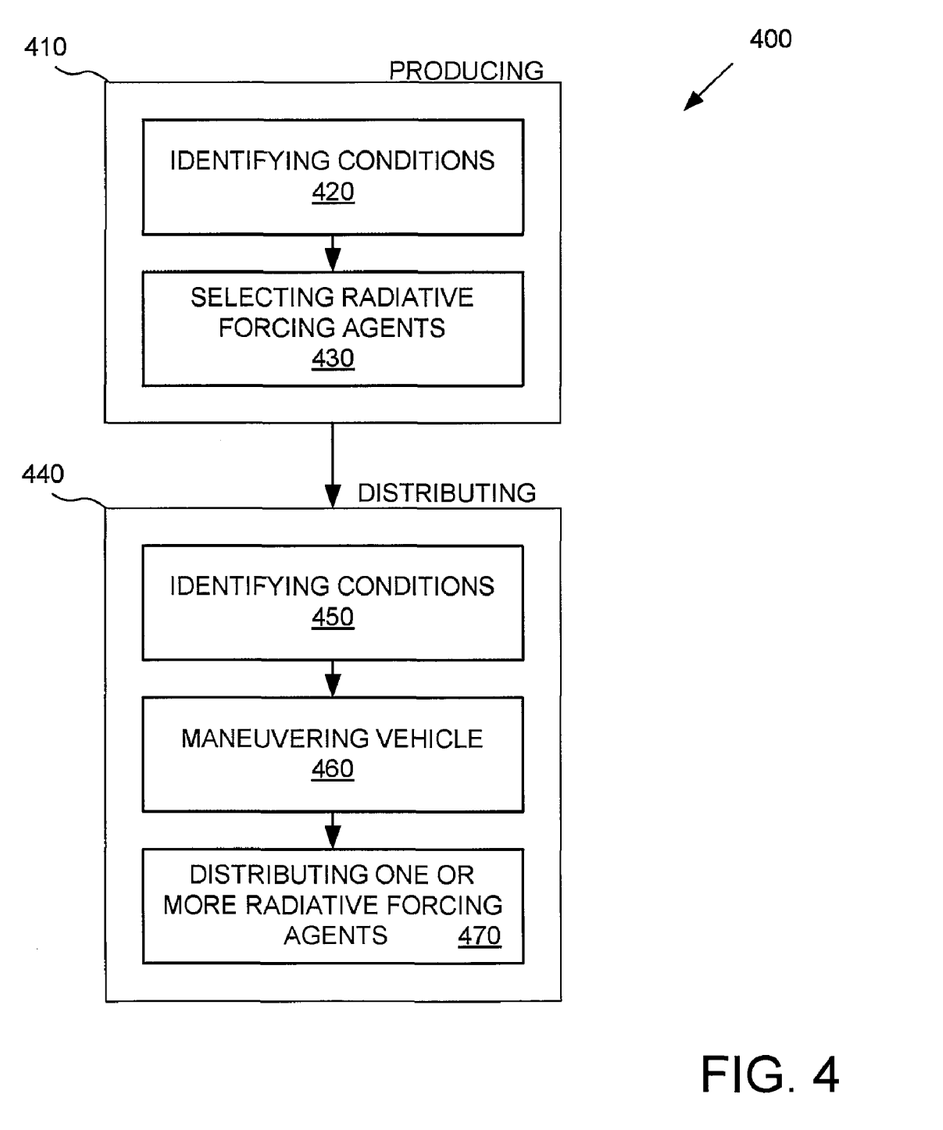
FIG. 4 is a flow chart depicting a method that includes producing or distributing one or more radiative forcing agents in accordance with yet another embodiment.

One example used by the 2007 Report to illustrate the effects of particle size, among other things, suggests that aerosol particles sized in the range of approximately 0.1 µm to 2.0 µm, and having high single scattering albedos, tend to scatter more shortwave radiation per unit mass than larger aerosol particles. While claimed subject matter is not limited to any particular particle characteristics, those skilled in the art will appreciate certain particle characteristics may be more desirable under certain conditions or circumstances. While not an exhaustive list, such conditions or circumstances which may additionally affect direct radiative forcing effects include atmospheric loading or geographic distribution, for example. Some of these conditions or circumstances are discussed in more detail below.

Turning to indirect radiative forcing effects, aerosols, to continue our example above, may be capable of producing negative indirect radiative forcing effects by acting as cloud condensation nuclei or ice nuclei. Concentrations of some aerosols, it is believed, may lead to an increase in the reflectance of clouds, which may also increase the cloud albedo. An increase in cloud albedo, which may sometimes be due, at least in part, to the influence of aerosols on clouds or cloud microphysics, may be capable of producing negative indirect radiative forcing effects. Indirect effects of aerosols on cloud albedo, among other properties, may be a complex function of aerosol particle size, relative humidity, cloud type, cloud optical properties, droplet number concentrations, extinction coefficients, and a host of other not yet well-understood factors. As indicated for direct radiative forcing effects, claimed subject matter relating to indirect radiative forcing effects is not limited in scope to any particular particle characteristics or distribution in specific atmospheric conditions, and those skilled in the art will appreciate certain particle characteristics may be more desirable under certain conditions or circumstances.

FIG. 3 is a schematic diagram depicting a system that includes embodiment 300 to distribute one or more radiative forcing agents to Earth's atmosphere. Vehicle 310 is displayed distributing radiative forcing agent 330 to Earth's atmosphere. As mentioned previously in embodiment 200, those skilled in the art will appreciate that vehicle 310 may be any vehicle capable of operating within Earth's atmosphere.

In embodiment 300, vehicle 310 does not need to produce one or more radiative forcing agents. Embodiment 300 depicts vehicle 310 as capable of having at least one repository, depicted as repository 320, capable of storing radiative forcing agent 330. While not limited to this embodiment, those skilled in the art will recognize that repository 320 may be for example, a plurality of repositories, such as a plurality of fuel tanks, or the vehicle itself, which could store radiative forcing agent 330. Embodiment 300 depicts repository 320 as being detachably attached to vehicle 310. Of course, repository 320 need not be so limited, and may, for example, comprise one or more internal tanks, one or more external tanks or some combination of external and internal tanks, which may be detachably attached, permanently affixed, or comprise some portions of vehicle 310 itself.

Radiative forcing agent 330 may here comprise aerosol, for example. Aerosols such as sulfate, fossil fuel organic carbon, nitrate or mineral dust, or soot, as some non-limiting examples, may, under certain conditions, have negative net radiative forcing values, which may correspond to negative net radiative forcing effects. In this embodiment, for example, radiative forcing agent 330 may be produced on the ground or in the air by some vehicle other than vehicle 310, and transferred to vehicle 310 while vehicle 310 is on the ground or operating within Earth's atmosphere. As with previous examples, it is to be understood that we intend to cover any manner of storage or transfer known to one of ordinary skill in the art and any examples are merely for illustrative purposes only.

Embodiment 300, depicts vehicle 310 equipped with control mechanisms, which may include one or more control surfaces, such as ailerons or a rudder, as just two examples. Control surfaces may be used to permit vehicle 310 to control its movement within Earth's atmosphere to distribute radiative forcing agent 330. Those skilled in the art will appreciate that vehicle 310 may be capable of adjusting movement within Earth's atmosphere utilizing mechanisms other than those mentioned above, like thrust vectoring, as an example.

Embodiment 300 depicts vehicle 310 distributing radiative forcing agent 330 to Earth's atmosphere. Of course, distribution of one or more radiative forcing agents may occur in any manner mentioned previously while not limited, however, to previous embodiments. Thus, radiative forcing agent 330 may be distributed, for example, by being introduced into an exhaust stream or by utilizing flight forces.

An advantage of this embodiment is that weight is preferably reduced on any vehicle capable of operating within Earth's atmosphere. Thus, any weight associated with producing one or more radiative forcing agents may be reduced. Another advantage of this embodiment, for example, is that it may be less onerous to produce desirable radiative forcing agent characteristics through production of one or more radiative forcing agents by some off-vehicle mechanism. Referring again to $SO_2$, as one example, it was mentioned above that $SO_2$ may be produced incident to combustion of typical aviation fuel. However, while the amount of $SO_2$ produced by typical aircraft fuel can be predicted with relative accuracy, it may be more difficult to control particular $SO_2$ particle characteristics. For example, while operating within Earth's atmosphere it may be difficult for a vehicle combusting typical aviation fuel to control $SO_2$ characteristics, such as particle size or the production of other sulfur oxides, throughout a range of combustion temperatures, engine designs, or throttle settings, as non-limited examples. Thus, obtaining desired radiative forcing agent characteristics under more controlled conditions, conditions which may more easily be obtained in ground facilities, for example, may be desired.

FIG. 4 is a flow chart depicting a method that includes embodiment 400 to produce or distribute one or more radiative forcing agents within Earth's atmosphere. Box 410, for example, depicts the production of one or more radiative forcing agents according to an embodiment. The production of one or more radiative forcing agents may occur, but need not occur, in any manner or condition previously mentioned in any embodiment, while not limited to any embodiment. Box 420 depicts production of one or more radiative forcing agents based at least in part on identifying conditions relating to the distribution of one or more radiative forcing agents. By way of example and not limitation, some conditions that may be identified include atmospheric conditions, geographic features, or time of day, season or year around which one or more radiative forcing agents may be distributed. To be clear, identification of conditions includes any or all conditions that may relate to the distribution of one or more radiative forcing agents, including, for example, any or all conditions affecting Earth's atmosphere.

Continuing embodiment 400 depicted in FIG. 4, Box 430 depicts selecting one or more radiative forcing agents with reference to the conditions identified according to Box 420.

For example, if conditions identified according to Box 420 are considered appropriate to obtain condensational accumulation on aerosol particles, at least in part with reference to distribution area, one or more radiative forcing agents may be selected to be produced to better achieve condensational accumulation. These conditions may, in this example, be considered desirable and may, under some circumstances, obtain the desired radiative forcing effect. In addition, selecting one or more radiative forcing agents to produce may also include selecting particular agent characteristics, such as a particular particle size, for example.

In contrast to the example above, depending on the conditions and the radiative forcing agent selected, condensational accumulation may be considered undesirable. The distribution of a particular radiative forcing agent over clouds, such as types of partially absorbing aerosols, for example, may decrease the ability of clouds to reflect incoming solar radiation. In this instance, the desired radiative forcing effect may be better obtained by distribution of one or more radiative forcing agents around relatively cloudless areas or dark surface features, such as non-polar oceans, as a non-limiting example. Additionally, aerosol particles considered small to act well as cloud condensation nuclei may be selected to be produced and distributed, for example.

While identifying conditions, as depicted in Box 420, is depicted in this embodiment as preceding selecting one or more radiative forcing agents, as depicted in Box 430, those skilled in the art will appreciate that it need not be so limited. Selecting one or more radiative forcing agents may occur without first identifying conditions depicted by Box 420. Likewise, as discussed in greater detail below, identifying conditions may in fact occur after the selection of one or more radiative forcing agents.

Referring again to FIG. 4, Box 440 depicts the distribution of one or more radiative forcing agents according to an Embodiment 400. Distribution of one or more radiative forcing agents may occur, but need not occur, in any manner or condition previously mentioned in any embodiment, while not limited to any particular embodiment.

Box 450 depicts distribution based at least in part on identifying conditions relating to the distribution of one or more radiative forcing agents. Identifying conditions depicted in Box 450 may often be substantially similar to identifying conditions depicted in Box 420. For example, similar to Box 420, Box 450 includes identification of any or all conditions that may relate to the distribution of one or more radiative forcing agents, which includes any or all conditions affecting Earth's atmosphere.

As depicted in embodiment 400, identifying conditions depicted in Box 450 may occur where one or more radiative forcing agents are not produced by a vehicle, for example, or may allow for near real-time distribution adjustments to distribution of one or more radiative forcing agents, as another example. Thus, identifying conditions relating to the distribution of one or more radiative forcing agents, such as humidity at a particular altitude may, for example, aid in obtaining the desired radiative forcing effect.

Box 460 depicts maneuvering the vehicle to distribute one or more radiative forcing agents to obtain the desired radiative forcing effects. Maneuvering the vehicle may occur, for example, utilizing control surfaces and may also occur based at least in part on pilot inputs, remote control, preprogramming or some combination thereof. As mentioned above, maneuvering the vehicle with reference to identified conditions depicted by Box 420 or Box 450, for example, may allow the vehicle to distribute one or more radiative forcing agents to obtain the desired radiative forcing effects, represented by Box 470.

Conditions or circumstances relating to the distribution of one or more radiative force agents tend to consist of multiple factors. Identification or consideration of some of these factors can produce numerous distribution embodiments. Thus, for example, one or more radiative forcing agents may be selectively distributed to particular areas with reference to, at least in part, conditions or circumstances identified in those particular areas.

One embodiment, for example, is distribution of one or more radiative forcing agents toward the equator. It is well known that the Sun's radiative energy strikes Earth at different angles. All things equal, more solar energy arrives for a given surface area in the tropics than at higher latitudes since the Sun's radiative energy strikes Earth at higher angles of incidence. Thus, distribution of one or more radiative forcing agents within or toward areas with higher angles of incidence, such as toward the equator, may be advantageous.

Interestingly, distribution of one or more radiative forcing agents toward the poles, toward higher latitudes, for example, may also be another sample embodiment. One or more radiative forcing agents may increase in optical depth relative to incoming radiation from the Sun where the angle of incidence may be less than orthogonal. Thus, incoming energy may have a greater likelihood of encountering one or more radiative forcing agents as the angle of incidence approaches zero.

In addition, any advantage achieved by lowering the angle of incidence relative to incoming radiant energy may be further bolstered by the effects of various optical phenomena. For example, additional reflection may be obtained from the effect of Brewster's angle, which exists at an interface between media with differing indexes of refraction at a particular angle. Obtaining the effects of Brewster's angle is a function of the incidence angle at which light is incident on a plane. Thus, since the angle that incoming radiant energy from the Sun will impinge on the Earth varies with latitude, altitude and by season—the latitudes, altitudes, and times at which the effects of Brewster's angle may be achieved may vary.

The discussion of Brewster's angle naturally leads to yet another distribution embodiment wherein one or more radiative forcing agents may be distributed with reference, at least in part, to some season or time of day. In the Northern Hemisphere, for example, it is generally accepted that the majority of the Sun's incoming radiant energy is directed toward the Tropic of Cancer on or about the Summer Solstice. Thus, distribution of one or more radiative forcing agents to areas with higher seasonal angles of incidence may be another advantage. Similarly, the distribution of one or more radiative forcing agents during the day may be another embodiment. In other words, distribution toward the portion of Earth impinged by incoming radiant energy from the Sun may encounter more radiant energy than the portion of the Earth facing away from the Sun.

Another sample embodiment is distribution of one or more radiative forcing agents at various altitudes. For example, depending on many variables, tropospheric residence times for aerosols tend to be relatively short, typically less than one week. In some cases, tropospheric aerosol particles may last hours or days depending, at least in part, on such factors as particle size and tropospheric humidity, for example. Stratospheric residence times for aerosols, in contrast, tend to last longer, with some lasting months or possibly longer. Differences in residence time, while often a function of particle size, may also be affected by processes in the atmosphere—particularly the troposphere—such as convection and precipitation. These and other processes typically remove aerosol or gases, among other things, residing within the troposphere. Thus, distribution of one or more radiative forcing agents in sizes and at altitudes to increase residence time to better obtain the desired radiative forcing effect, such as distribution of one or more radiative forcing agents to the stratosphere or above, for example, may be advantageous.

In contrast, particular reflecting agents may be advantages if distributed into the Troposphere. For example, some species of aerosol are water-soluble and may be sufficiently large to act as a cloud condensation nuclei. Aerosol that have these or similar characteristics, for example, may be distributed in the troposphere, which typically contains more water than other layers of the atmosphere. In addition, distribution could also occur at altitudes or within atmospheric conditions that may favor cloud formation, such as, for example, during particular seasons or during particular times of day.

While some of the advantages of distribution are discussed alone, many advantages are interrelated, and may be obtained in combination. Particular characteristics of one or more radiative forcing agent may be chosen with at least some reference to obtaining the desired radiative forcing effect. Moreover, conditions relating to distribution of one or more radiative forcing agents, such as altitude, latitude, humidity, and many others detailed and not detailed herein, may be selected with at least some reference to obtaining the desired radiative forcing effect.

In the preceding description detailing a few sample advantages of distribution of one or more radiative forcing agents within Earth's atmosphere, those skilled in the art will appreciate that any advantage set forth above does not limit the scope of claimed subject matter. For example, reference to or description of any particular range of latitudes, or times of day, or atmospheric conditions, as being advantageous does not in any way limit the distribution of one or more radiative forcing agents at any latitude, or time of day, or atmospheric condition.

In the preceding description, various aspects of claimed subject matter have been described. For purposes of explanation, specific numbers, systems or configurations were set forth to provide a thorough understanding of claimed subject matter. However, it should be apparent to one skilled in the art having the benefit of this disclosure that claimed subject matter may be practiced without the specific details. In other instances, features that would be understood by one of ordinary skill were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A system comprising: a vehicle capable of operating within Earth's atmosphere, said vehicle also including an apparatus capable of producing one or more radiative forcing agents, wherein said apparatus comprises a heat source capable of producing sufficient heat to induce a physical or chemical change in one or more radiative forcing constituents, at least in part.

2. The system of claim 1, wherein said vehicle capable of operating within Earth's atmosphere comprises an airplane.

3. The system of claim 1, wherein said vehicle capable of operating within Earth's atmosphere is capable of flight.

4. The system of claim 1, wherein said heat source is capable of producing sufficient heat to induce a physical or chemical change in one or more radiative forcing reactants, at least in part.

5. The system of claim 4, wherein said one or more radiative forcing reactants includes aviation fuel.

6. The system of claim 1, wherein said heat source comprises an engine.

7. The system of claim 1, wherein said heat source comprises exhaust.

8. The system of claim 1, wherein said heat source capable of producing one or more radiative forcing agents includes producing one or more radiative forcing agents as a product of combustion, at least in part.

9. The system of claim 1, wherein said one or more radiative forcing agents comprise a gas.

10. The system of claim 1, wherein said one or more radiative forcing agents comprise an aerosol.

11. The system of claim 9, wherein said gas includes $SO_2$.

12. The system of claim 1, wherein said vehicle capable of operating within Earth's atmosphere is further capable of distributing said one or more radiative forcing agents during operation within Earth's atmosphere.

13. The system of claim 12, wherein said vehicle further capable of distributing said one or more radiative forcing agents during operation within Earth's atmosphere is further capable of distributing said one or more radiative forcing agents during flight.

14. The system of claim 12, wherein said vehicle further capable of distributing said one or more radiative forcing agents during operation within Earth's atmosphere includes distributing said one or more radiative forcing agents utilizing exhaust, at least in part.

15. The system of claim 1, wherein said vehicle capable of operating within Earth's atmosphere is further capable of storing one or more radiative forcing agent constituents.

16. The system of claim 1, wherein said vehicle capable of operating within Earth's atmosphere is further capable of storing one or more radiative forcing agent reactants.

17. The system of claim 16, wherein said storing one or more radiative forcing agent reactants includes storing one or more aviation fuels.

18. The system of claim 17, wherein said aviation fuels comprise fuel with sulfur contents equal to or greater than 0.1%.

19. A method comprising: producing one or more radiative forcing agents; and distributing said one or more radiative forcing agents to Earth's atmosphere, wherein said producing one or more radiative forcing agents includes inducing a chemical or physical change in one or more radiative forcing reactants by combusting aviation fuel to produce SO2, at least in part.

20. The method of claim 19, wherein said producing one or more radiative forcing agents includes inducing a chemical or physical change in one or more radiative forcing constituents.

* * * * *